United States Patent [19]

Kuper et al.

[11] Patent Number: 4,949,346
[45] Date of Patent: Aug. 14, 1990

[54] CONDUCTIVELY COOLED, DIODE-PUMPED SOLID-STATE SLAB LASER

[75] Inventors: Jerry W. Kuper, Martinsville; William R. Rapoport, Bridgewater, both of N.J.

[73] Assignee: Allied-Signal Inc., Morris Township, Morris County, N.J.

[21] Appl. No.: 393,185

[22] Filed: Aug. 14, 1989

[51] Int. Cl.$^5$ .............................................. H01S 3/04
[52] U.S. Cl. ....................................... 372/36; 372/34; 372/66; 372/69; 372/72; 372/75
[58] Field of Search ........................ 372/34, 36, 66, 69, 372/72, 75

[56] References Cited

U.S. PATENT DOCUMENTS

| | | | |
|---|---|---|---|
| 3,327,232 | 6/1967 | Tomiyasu | 372/99 |
| 3,413,567 | 11/1968 | Hannwacker et al. | 372/36 |
| 3,423,693 | 1/1969 | Chernoch et al. | 372/72 |
| 3,665,335 | 5/1972 | Tomiyasu | 331/94.5 |
| 3,683,296 | 8/1972 | Scalise | 372/36 |
| 4,027,273 | 5/1977 | Yang | 372/36 |
| 4,345,643 | 8/1982 | Dawson et al. | 372/36 |
| 4,468,774 | 8/1984 | Robbins | 372/34 |
| 4,734,913 | 3/1988 | Morris et al. | 372/34 |
| 4,734,917 | 3/1988 | Johnson | 372/70 |
| 4,800,569 | 1/1989 | Azad | 379/99 |

FOREIGN PATENT DOCUMENTS 0876017 10/1987 U.S.S.R. ............................. 372/70

OTHER PUBLICATIONS

Allen et al., "Continuous Operation of a YAlG:Nd Laser by Injection Luminescent Pumping"; Appl. Phys. Leter, vol. 14, No. 6, Mar. 15, 1969; pp. 188–190.

Primary Examiner—William L. Sikes
Assistant Examiner—Georgia Y. Epps
Attorney, Agent, or Firm—Gerhard H. Fuchs; Richard Stewart

[57] ABSTRACT

A conductively cooled, optically diode-pumped slab laser comprises a slab laser host 1 having transparent, thermally conductive heat sink means 2 bonded to its pump faces. Semiconductor lasers or light emitting diodes 3 are mounted on the heat sink means for generating pumplight which is transmitted through the heat sink means 2 into laser host 1 to cause lasing. Heat flow within the laser host 1 is substantially bi-directional, thereby minimizing optically harmful thermal distortion of the host. The apparatus can function as laser amplifier, laser oscillator or combined oscillator/amplifier.

10 Claims, 2 Drawing Sheets

CONDUCTIVELY COOLED, DIODE-PUMPED SOLID-STATE SLAB LASER

BACKGROUND OF THE INVENTION

1. Field of the Invention

This invention relates to a diode-pumped, conductively cooled solid-state slab laser having transparent, thermally conductive solid heat sink means bonded to the pumped faces of the slab for bi-directional cooling of the lasing medium by conduction.

2. Description of the Prior Art

U.S. Pat. No. 4,734,913 to Morris et al. discloses a unitary solid state laser having a solid transparent housing with two cavities. A laser medium is embedded in one cavity and a pump lamp in the other. The housing completely surrounds the laser medium, so that cooling of the medium by the housing is omnidirectional.

Fluid cooled slab lasers are disclosed, for example, in U.S. Pat. Nos. 4,800,569 to Azad, 4,734,917 to Johnson, 4,468,774 to Robbins and 3,665,335 to Tomiyasu.

SUMMARY OF THE INVENTION

In accordance with the present invention, a conductively cooled, optically diode-pumped slab laser apparatus comprises, in combination, (a) an elongated slab of active laser host having two opposite ends and a pair of parallel, optically plane faces extending along its length for receiving radiation for optical pumping of the host, and for acting as total internal reflective surfaces for creating internal optical paths; (b) first and second transparent, thermally conductive solid heat sink means, each having an optically plane face which is dimensioned to match and is bonded to an optically plane face of said laser host by means of a bonding agent, which bonding agent has a refractive index which is smaller than the refractive index of the laser host, said heat sink means having a substantially flat surface opposite the optically plane face for mounting semiconductor diode pumping means; and (c) semiconductor diode pumping means mounted on said heat sink means for exciting the laser host.

The laser apparatus of the present invention may function as a laser oscillator, a laser amplifier or a combined oscillator/amplifier. In the event the laser apparatus is to function as a laser oscillator, it will be provided with reflectors adjacent to the opposite ends of the laser host to define an optical resonant cavity to support coherent radiation emitted by the laser host, optionally along with multi-plexed amplifier passes.

Preferably, the laser host is alexandrite, emerald or Nd:YAG. The transparent, thermally conductive heat sink means are preferably sapphire. Desirably, the sides of the laser host which are not bonded to the transparent, thermally conductive heat sink means are thermally insulated from the surroundings.

In the conductively cooled, diode-pumped solid-state slab laser of our invention, conductive cooling is essentially bi-directional, so that thermal gradients in the slab are predominantly contained in the plane normal to the pumped face. This provides laser beam compensation for thermal lensing and distortion using the zigzag optical path. By the term "semiconductor diode pumping means mounted on said heat sink means" we mean that the semiconductor diode pumping means, e.g. a light emitting diode which will ordinarily be in the form of a substantially flat sheet, is located in contact with, or in close proximity to, that surface of the heat sink means opposite the optically plane face, with its light emitting surface toward the heat sink means. Desirably, the light emitting surface is in contact with, or bonded to, the heat sink means.

Bonding between heat sink means and laser host slab may conveniently be effected using a bonding agent, particularly a thermally fusable bonding agent having high optical transmission in the pump region, such as glass frit.

The semiconductor diode pumping means may be a semiconductor laser or a light emitting diode. Both are well known as suitable for pumping solid state lasers. The semiconductor diode pumping means may be any of the diodes emitting light at the wavelength capable of optically pumping the laser host, to effect lasing action. Such diodes are commercially available.

Optionally, the heat sinks may be provided with heat exchange means, such as internal passages for passing heat exchange fluid therethrough, external cooling fins, and the like. By such means it is possible to control the temperature of the apparatus in operation within desired limits, for purposes such as controlling damage due to overheating, or for operation within temperature ranges of optimal laser host performance, while at the same time maintaining the bi-directional heat flow within the lasing medium, with its attendant benefits.

BRIEF DESCRIPTION OF THE DRAWINGS

In the annexed drawings, wherein like numerals denote like parts.

DETAILED DESCRIPTION OF THE INVENTION

Figure 1:
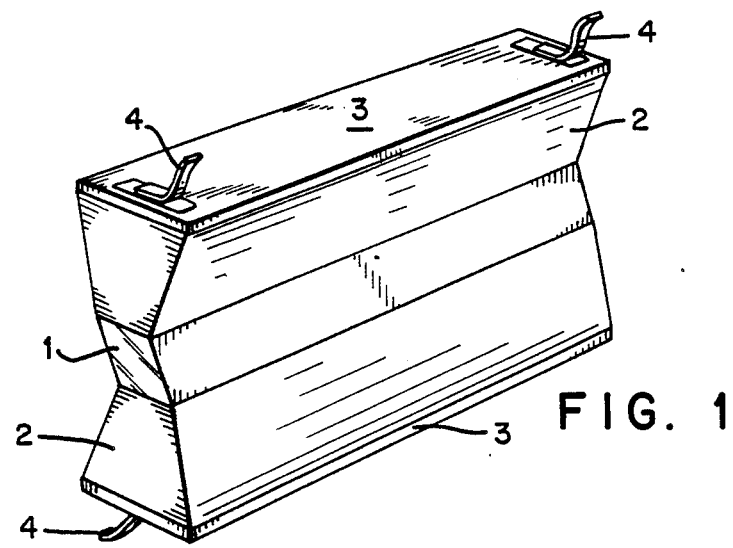
FIG. 1 is an isometric view of one embodiment of the conductively cooled, diode-pumped slab laser apparatus of the present invention.

With reference to FIG. 1, the conductively cooled, diode-pumped solid-state slab laser apparatus of the present invention comprises a slab laser host 1 having two opposites ends and a pair of parallel optically plane faces extending along its length. To the parallel, optically plane faces are bonded transparent, thermally conductive heat sinks 2. On the opposite sides of heat sink 2 (opposite the sides that are bonded to slab laser host 1) are mounted semiconductor diode pumping means, here illustrated by light emitting diodes 3. Light emitting diodes 3 serve to excite the laser host 1 by providing light for optical pumping of laser host 1. Leads 4 serve to feed electric current to light emitting diodes 3 to cause light emission.

Figure 2:
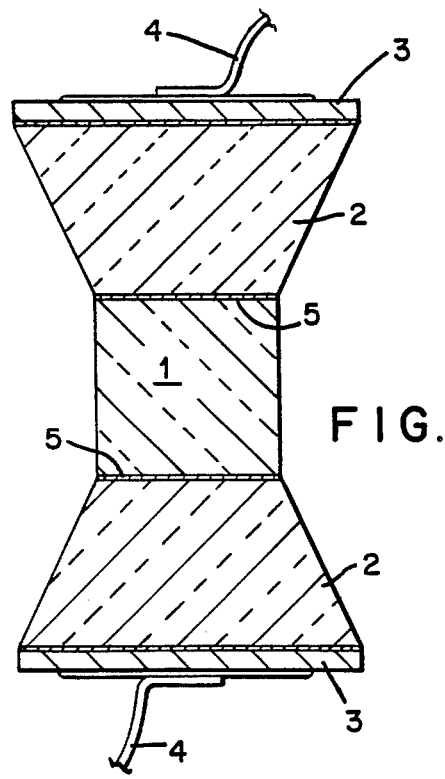
FIG. 2 is a view of the apparatus of FIG. 1 in transverse cross-section.

FIG. 2 is a transverse cross-sectional view of the apparatus illustrated in FIG. 1. Heat sink means 2 are bonded to slab laser host 1 by means of bonding layer 5. Light emitting diodes 3 having electrical leads 4 are mounted on the opposite sides of heat sink means 2. Bonding layer 5 between heat sink means 2 and slab laser host 1 must have a refractive index that is smaller than the refractive index of the slab laser host, so that the total internal reflective bounces are greater than the critical angle, thereby providing that the optically plane faces extending along the length of slab laser host 1 act as total internal reflective surfaces for creating optical paths within the slab. Conveniently, the bonding agent (usually glass) which will form the bonding layer 5 is provided as a powder (frit). The bonding agent is positioned between the optically plane faces of the slab laser host 1 and heat sink means 2, followed by heating under clamping pressure to effect thermal fusion of the bonding agent and bonding of the mating surfaces. A convenient form of glass powder bonding agent is commercially available in the form of tape comprising glass powder held together by a binder; the binder evaporates or is destroyed in the thermal fusion step. Bonding agents further should have high optical transmission in the spectral region of interest, and relatively good match of thermal expansion coefficient. In addition, the bonding agent should have a melting point that is low enough that the agent can be melted (and solidified) without damaging the parts being bonded. Also, the bonding agent should not deteriorate during exposure to the heat and radiation generated by operation of the laser. Low melting glasses, certain polymers such as silicon elastomers and other similar materials well known in the art are suitable bonding agents. Care should be taken in bonding the slab laser host to the heat sink means to avoid introduction of bubbles or other inhomogeneities.

Figure 3:
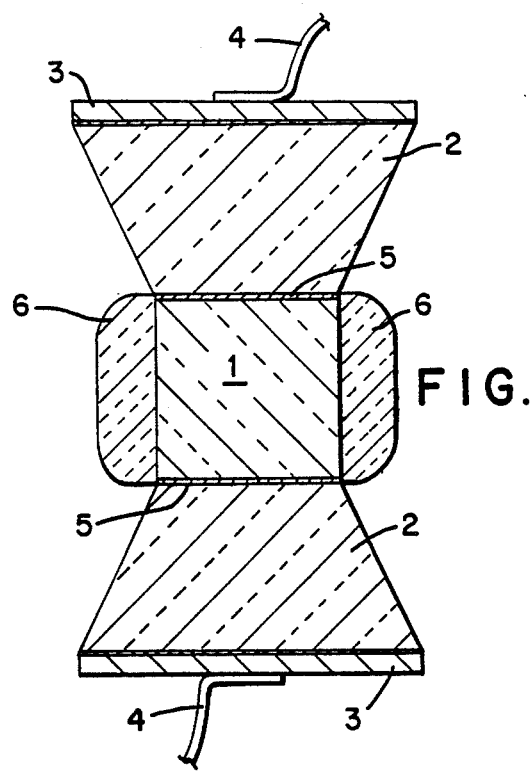
FIG. 3 is a transverse cross-sectional view of the apparatus of FIG. 1, wherein the un-pumped faces of the slab laser host are covered with thermal insulating means.

FIG. 3 is a transverse cross-sectional view of apparatus of the type illustrated by FIG. 1 showing the slab laser host 1 to which there are heat sink means 2 onto which there are mounted semiconductor diode pumping means 3 having electrical leads 4. Between slab laser host 1 and heat sink means 2 a bonding laYer 5 is provided. In addition, the free sides of slab laser host 1 are thermally insulated from the surrounding environment by means of insulating strips 6. The insulating strips 6 aid in providing bi-directional conductive heat flow from laser host 1 to heat sink means 2 in the plane normal to the pumped face, and thereby provide laser beam compensation for thermal lensing and distortion of the laser host 1. Heat sinks 2 may optionally be provided with a reflective coating, which would aid in reducing escape of pump light from the heat sink except at the optically plane face which is bonded to the laser host (and except possibly at the ends, if uncoated), thereby enhancing the efficiency of utilization of the pump light. Silver or gold are preferred reflector media.

Figure 4:
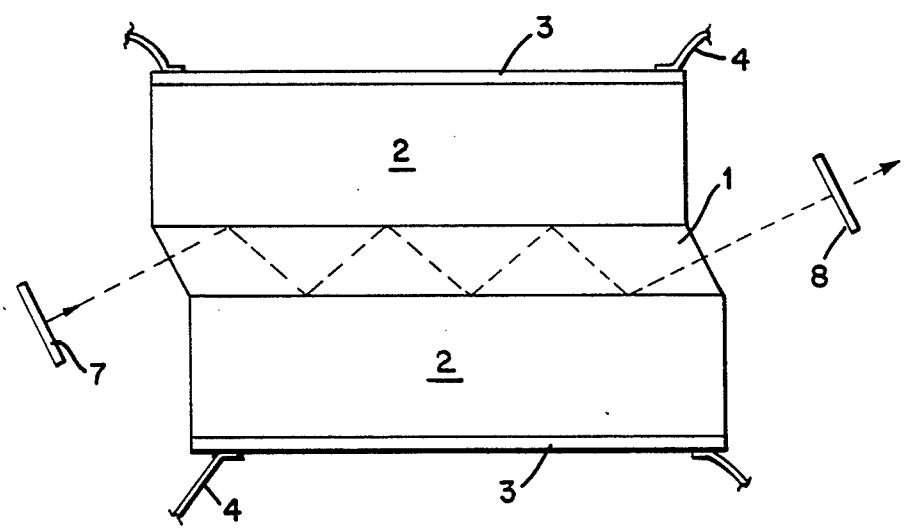
FIG. 4 is a schematic view of laser apparatus of the present invention having reflector means adjacent to the opposite ends of the laser host that define an optical resonant cavity and support coherent radiation emitted by the laser host.

The conductively cooled slab laser apparatus of the present invention may be operated as a laser amplifier, as a laser oscillator, as well as a combined laser amplifier/oscillator. In the event it is to be used as a laser amplifier, reflecting means for establishing a lasing cavity for oscillation need not be provided. However, in the event that the apparatus is to be used as a laser oscillator, as schematically illustrated in FIG. 4, it will be necessary to provide reflecting means for defining a lasing cavity, as is illustrated in FIG. 4, by providing a total reflector 7 and a partial reflector 8 at opposite ends of slab laser host 1.

The laser host may be any solid material capable of supporting lasing action. Illustrative materials include alexandrite, emerald, Nd:YAG, Nd:BEL, Ti-Sapphire, and the like. Since during operation the laser host, heat sink and light emitting diode all heat up, it is preferred to utilize laser media, like alexandrite and emerald, whose output efficiency is not diminished at elevated temperatures.

The semiconductor diode pumping means, i.e., the light emitting diodes and semiconductor lasers suitable for exciting the solid-state laser hosts employed in the apparatus of the present invention are well known. These are semiconductor devices capable of converting electricity into optical radiation through radiative transition at the p-n junction. The choice of the semiconductor depends primarily on the wavelength light output required for efficiently exciting the laser host. The most important factor is the band gap energy. However, practical considerations, such as the possibility of achieving reasonable efficiency and ease of manufacture will limit the choice. In any event, semiconductor diodes capable of emitting in the spectral range suitable for exciting the solid state laser hosts employed in our apparatus are well known and commercially available from several sources. In general, they are based on zinc blende-type compounds composed of elements from groups IIIA and VA of the periodic table. These emit in the visible or near infrared region of the spectrum. For diodes emitting deeper in the infrared region, compounds composed of elements in Groups IVA and VIA are suitable. Specific examples of preferred diodes are AlGaAs diodes for Nd:YAG; InAlGaAs diodes for alexandrite and emerald. Light emitting diodes are available in flat sheet form, as illustrated in the drawings, and this form is preferred for present purposes. Semiconductor lasers are readily arranged in a flat array with their output directed toward the heat sinks to be directed toward the slab laser host. In essence, semiconductor injection lasers are simply light emitting diodes with certain geometric constraints, as the result of which they are capable of producing stimulated emission.

An important criterion for the choice of material of construction for the heat sink is that it transmits in the wavelength region of the laser pump bands. Typical of materials that are suitable are certain glasses, fused silica, quartz, chrysoberyl and sapphire. Sapphire and fused silica are preferred, because they are suitable and readily available commercially. Sapphire is a preferred material because of its superior thermal shock resistance. Glass moldings are also suitable. The relevant parameters that guide the choice of materials in a particular instance, e.g., transmission spectra, thermal conductivity, thermal expansion coefficients and index of refraction are tabulated in reference works, such as The American Institute of Physics Handbook, published by McGraw-Hill.

Since various changes may be made in the invention without departing from its spirit and essential characteristics it is intended that all matter contained in the description shall be interpreted as a illustrative only and not in a limiting sense, the scope of the invention being defined by the appended claims.

We claim:

1. A conductively cooled, optically diode-pumped slab laser apparatus comprising, in combination:
   (a) an elongated slab of active laser host having two opposite ends, two opposed sides, and a pair of parallel, optically plane faces extending along its length for receiving radiation for optical pumping of the host, and for acting as total internal reflective surfaces for creating internal optical paths;

(b) first and second transparent, thermally conductive solid heat sink means, each having an optically plane face which is dimensioned to match and is bonded to a parallel optically plane face of said laser host by means of a bonding agent having a rafractive index which is smaller than the refractive index of the laser host, said heat sink means having a substantially flat surface opposite the one cavity optically plane face for mounting semiconductor diode pumping means; and (c) semiconductor diode pumping means mounted on said heat sink means for exciting the laser host.

2. The apparatus of claim 1, wherein said laser host is selected from the group consisting of alexandrite, emerald and Nd:YAG.

3. The apparatus of claim 1, wherein the material of construction of said heat sink means is selected from the group consisting of fused silica and sapphire.

4. The apparatus of claim 1, wherein said laser host is selected from the group consisting of alexandrite, emerald and Nd:YAG, and wherein the material of construction of said heat sink means is selected from the group consisting of sapphire and fused silica.

5. The apparatus of claim 1 further provided with thermal insulating means covering said two opposed sides of said elongated slab of laser host.

6. The apparatus of claim 5, wherein said laser host is selected from the group consisting of alexandrite, emerald and Nd:YAG, and wherein the material of construction of heat sink means is selected from the group consisting of sapphire and fused silica.

7. The apparatus of claim 5, wherein said semiconductor diode pumping means is a semiconductor laser, wherein said laser host is alexandrite, and wherein the material of construction of said heat sink means is selected from the group consisting of sapphire and fused silica.

8. The apparatus of claim 5, wherein said semiconductor diode pumping means is a diode laser, wherein said laser host is Nd:YAG, and wherein said heat sink means is made of sapphire or fused silica.

9. The apparatus of claim 5, wherein said light emitting diode is an InAlGaAs semiconductor diode, wherein said laser host is alexandrite, and wherein said heat sink means is made of a material selected from the group consisting of sapphire and fused silica.

10. The apparatus of claim 7, wherein said heat sink means is made of sapphire.

* * * * *